Dec. 17, 1957    H. BARLOW    2,816,366
CENTERING DEVICE
Filed Feb. 15, 1956

INVENTOR.
HAROLD BARLOW
BY
ATTORNEYS

United States Patent Office 2,816,366
Patented Dec. 17, 1957

2,816,366

CENTERING DEVICE

Harold Barlow, Flushing, N. Y.

Application February 15, 1956, Serial No. 565,658

3 Claims. (Cl. 33—180)

This invention relates to a centering device particularly useful for the positioning of pictures, lettering symbols, etc. on a backing or sheet material.

Among the objects of the invention is to provide a simply constructed device which is easy to operate and foolproof for centering a relatively small piece of material upon a larger backing surface.

The general practice in centering a photograph or a sketch, for example, on a backing sheet is first to measure the width of the backing sheet, divide this by two to find the central point, then measuring and marking the central point of the backing sheet, thereafter the width of the photograph is measured divided by two and the result is measured off on both sides of the central point.

Among other objects of this invention is to provide a device for measuring such distances automatically and quickly in a very efficient way without necessitating any marking of the backing sheet.

The objects of this invention are attained by providing a straight edge device with a movable, tightly stretched, endless belt or band extending substantially the full length thereof to opposite stretches of which band are attached two slider devices at equally spaced points on the belt.

The band may be made of any flexible but relatively non-stretchable material such as cotton cord, nylon cord, leather thongs, metal chains, plastic monofilaments, etc.

The slider devices are preferably constructed so as to extend at right angles across the straight edge.

The belt is attached for movement along the straight edge means adjacent the ends thereof by means of stationary axles, rotating sleeves, etc. The band must move freely around the attaching means at the ends of the straight edge. If a neater arrangement is desired, one or more grooves may be provided in the straight edge to provide a path in which the belt moves.

A better understanding of the invention will be obtained from the following description of a specific embodiment and method of operation thereof as illustrated in the accompanying drawing in which—

Figure 1:
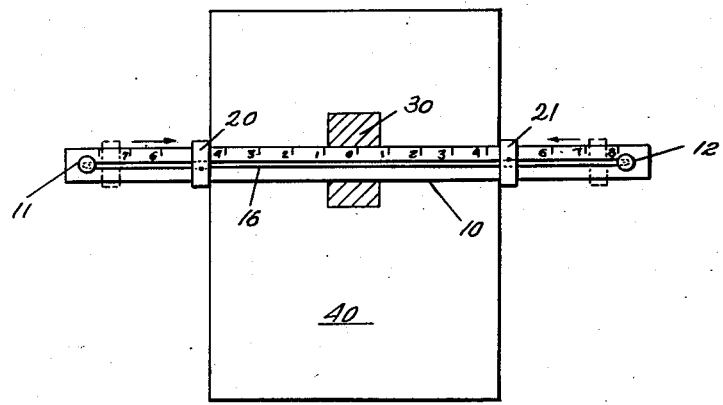
Figs. 1 and 2 illustrate steps in the operation of the device to center a small sheet upon a backing sheet.
Figure 2:
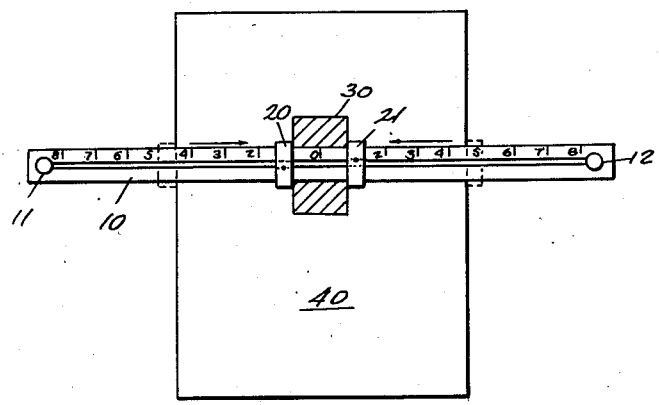
Figure 3:
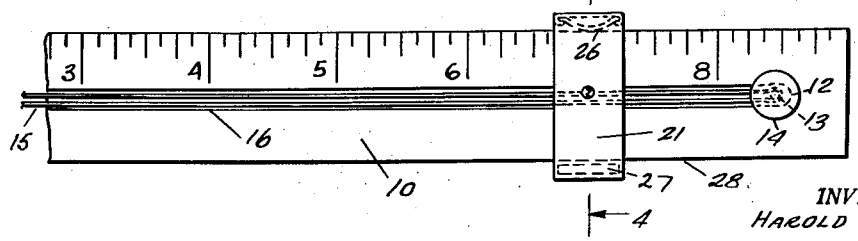
Fig. 3 is an enlarged detail view of the centering device.

The centering device shown comprises a ruler type base 10 adjacent each end of which a headed stud or pin 11, 12 is fixed. This headed stud has a shaft portion 13 which is smooth, around which a string, cord or band 15 is adapted to slide readily. In the device shown a groove 16 is cut in the ruler 10 in which groove the cord or band 15 extends and is adapted to be moved. If desired more than one stud member may be employed at each end.

A pair of slider elements 20, 21 are fixed to opposite sides of the cord or band 15. As shown in the drawing the slider 20 is fixed to the lower course of the band 15 and the slider 21 is fixed to the upper course of the band 15. The length of cord extending in a clockwise direction from the slider 21 to the slider 20 is exactly equal to the length of cord extending from the slider 21 to slider 20 in a counter clockwise direction. Slider 20 cannot be moved without moving the cord 15 with respect to the base 10 and without moving slider 21 an equal distance in the opposite direction.

If desired the ruler 10 can be calibrated in inches or suitable units and as illustrated in Fig. 1 the units may be numbered outwardly from the exact center denoted as zero in the device of Fig. 1. This permits an accurate check when it is suspected that the device has been used improperly.

Figure 4:
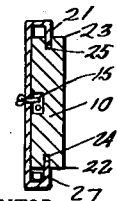
Fig. 4 is a cross sectional view of the device taken on line 4—4 of Fig. 3.

The slider elements 20 or 21 are preferably constructed so that they are always in the same angular position with respect to the base 10 of the device. A very satisfactory way of making these sliders travel in proper angular position is to employ one or more of the structural features of the slider of the common slide rule. Thus, as shown in Fig. 4 the slide 21 has flanges 22, 23 adapted to run along the edge grooves 24 and 25 of the ruler base 10. The flange 22 includes an insert 27 adapted to slide easily on the edge 28 of ruler 10 which insert 27 is held on the edge 28 by the spring 26 located in the upper grooved portion 23 of the slide 21. The edge 28 is accurately formed on the base 10 so that holding flange 22 against this edge 28 accurately positions the slide on the ruler.

In order to describe the operation of the device suppose that it is desired to accurately position the picture 30 on the backing sheet 40. First the slider 20 is grasped and held against the left side of sheet 40. Then the ruler 10 is moved either by grasping the ruler or the slider 21 with the other hand and moving it until the slider 21 is at the opposite side of the sheet. At this point the zero point of the device as shown is exactly on the vertical center line of sheet 40. Then the ruler 10 is held in position on sheet 40 and one or the other of sliders 20 or 21 is pushed inwardly until the picture 30 just fits therebetween. The picture 30 is then accurately centered in the sheet 40.

The features and principles underlying the invention described above in connection with specific exemplifications will suggest to those skilled in the art many other modifications thereof. It is accordingly desired that the appended claims shall not be limited to any specific feature or details thereof.

I claim:

1. In a centering device for accurately centering a device of smaller size upon a planar surface of larger size, a straight edged base member, means adjacent each of the two ends of the base member having an exposed shaft portion around which a band is adapted to move, an endless band stretched around said exposed shaft portions so as to be movable in a closed path thereabout, a pair of slider elements, a first of said slider elements being attached to the upper course of said band, the second of said slider elements being attached to the lower course of said band, each of said slider elements having exposed straight line inner edges extending perpendicular to the straight edge of the base member whereby the edge portions of the slider elements act to line up the device with the sides of the planar surface and the sides of the device to be centered.

2. The device as claimed in claim 1 in which the length of the band on a clockwise direction from the first slider element to the second slider element is equal to the distance in a counter clockwise direction from the first slider element to the second slider element.

3. The device as claimed in claim 1 in which the base member contains a groove in which the endless band is adapted to move.

References Cited in the file of this patent

UNITED STATES PATENTS

| | | |
|---|---|---|
| 1,139,165 | Cobb | May 11, 1915 |
| 1,855,037 | Vroom | Apr. 19, 1932 |
| 1,972,604 | Smith | Sept. 4, 1934 |
| 2,246,920 | Kromholz | June 24, 1941 |